United States Patent
Isip, Jr.

(10) Patent No.: US 6,401,089 B2
(45) Date of Patent: *Jun. 4, 2002

(54) METHOD FOR MAINTAINING EXCEPTION TABLES FOR A CHECK UTILITY

(75) Inventor: Amando B. Isip, Jr., Richardson, TX (US)

(73) Assignee: Computer Associates Think, Inc., Islandis, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,533

(22) Filed: Oct. 27, 1998

(51) Int. Cl.[7] .............................................. G06F 17/30
(52) U.S. Cl. .............................................. 707/7; 707/2
(58) Field of Search .......................... 707/7, 2, 4, 101, 707/200, 201, 8, 10, 102, 100

(56) References Cited

U.S. PATENT DOCUMENTS

| | | | | |
|---|---|---|---|---|
| 5,594,899 A | * | 1/1997 | Knudsen et al. | 707/2 |
| 5,706,494 A | * | 1/1998 | Cochrane et al. | 707/2 |
| 5,732,262 A | | 3/1998 | Gillespie et al. | 707/102 |

* cited by examiner

Primary Examiner—Sanjiv Shah
(74) Attorney, Agent, or Firm—Baker & McKenzie

(57) ABSTRACT

A method for maintaining exception tables for a CHECK utility includes generating a control statement including key words and associated values for predetermined exception table parameters. The control statement is parsed by the CHECK utility which automatically builds and executes SQL statements required to create and drop exception tables.

9 Claims, 2 Drawing Sheets

METHOD FOR MAINTAINING EXCEPTION TABLES FOR A CHECK UTILITY

FIELD OF THE INVENTION

The present invention relates to database management systems, and particularly to a method for exception tables for a check utility in a database management system.

BACKGROUND INFORMATION

A well known database software program is DATABASE 2 (DB2) database software distributed by IBM Corporation. As is known in the art, DB2 operates as a subsystem in a computer system operating under the IBM MVS operating system software. In a DB2 environment, user data resides in DB2 tables which are in tablespaces. A tablespace is, for example, a portion of storage space in a direct access storage device (DASD) such as a disk drive. For exemplary purposes, illustrated below is an order_entry table that would be stored in a tablespace. The order_entry table contains columns: customer_number; product_code; order_number; buyer_name; and ship to zip.

Order_Entry Table

| customer_number | product_code | order_number | buyer_name | ship_to_zip |
|---|---|---|---|---|
| 1111111111 | 0010 | 1234500001 | John Doe | 60606 |
| 1111111111 | 0040 | 1234500002 | Jane Doe | 70707 |
| 3333333333 | 0020 | 1234500003 | Bill Smith | 90909 |
| 2222222222 | 0030 | 1234500004 | Fred Smith | 80808 |

While the above Order_Entry table shows four rows, the table could have millions of rows for all the orders of a company, for example 4 million rows. The order_entry table also has, for example, three index keys and two foreign keys. An index key is an identifier for a particular row of a table while a foreign key also identifies a row but is also used for referential integrity as described below. For example, in the order_entry table, one index key could be based on Order_Number, another index key based on buyer_name and a third index key based on ship_to_zip. As is known in the art, an index key for a particular table indicates a row identification (RID) and a selected value for the row (e.g., the index key value).

The index key can be used to generate an index for the table which facilitates subsequent searches for particular data in the table. For example, the Order_Entry table would have three indexes (e.g., one for each index key), each index being stored in an indexspace. Similar to a tablespace, an indexspace is, for example, a designated portion of a DASD. Thus, if a user was looking for rows that contain a particular buyer name in the Order_Entry table, the database management system could query the buyer index for the table to identify all occurrences of the buyer name without reading the entire table to locate the rows.

DB2 administrators analyze performance characteristics for application programs that access a database table in an attempt to find the optimum index structure for fast access to the database table. The values to be used as an index must be carefully selected because each index results in overhead for the database system. For example, each transaction in a database table, such as an add or delete, requires that each index for the table also be updated. Thus, it is desirable that the number of indexes for a table be minimized to enhance the performance of application programs. The values to be used as an index for a database table are selected based on, for example, data accessed most frequently by users of the table, generally on-line transaction users. Index keys generally are not based on foreign keys, as foreign keys are used primarily for validation purposes (e.g., constraint enforcement).

As is known in the art, each table in a database may be either a parent table, a child table or both. A child table is related to a parent table via the foreign key value or values contained in columns of the child table. For example, a foreign key value can appear multiple times in a child table (e.g., multiple rows in a child table can have the same foreign key, such as the customer_number and product_code entries in the order_entry table) but each foreign key must be associated with a unique key in a parent table of the child table.

Referential integrity ensures that every foreign key value is valid (e.g., has a corresponding primary key in a parent table). Thus, referential integrity (RI) means that a value in the column of a row in the table is valid when this value also exists in an index of another table. A row should not be in a table if it violates a constraint. As the order_entry table illustrated above has two foreign keys, it has a RI constraint on customer_number and product_code. As is known in the art, when a user of a DB2 database management system creates a table, the user also defines the constraints for the table (e.g., the user can define the relational integrity criteria). Illustrated below are an exemplary product table and an exemplary customer table (e.g., the parent tables for the foreign keys in the order_entry table).

Product Table

| product_code | product_description | retail_price |
|---|---|---|
| 00010 | laptop pc | 1000.00 |
| 00020 | desktop pc | 1100.00 |
| 00030 | office pc | 1200.00 |
| 00040 | lan pc | 3500.00 |
| 00050 | home pc | 999.99 |

The product table show five rows, although the table could have thousands of rows for all of the different products of a company. The product table has, for example, an index based on the column product_code, which values are illustrated in ascending order. The values in the column product_code are each unique since there is only one product code assigned to each product and thus in this table, a product code would not be included more than once. Accordingly, an index for the product table would include the key value (e.g., the stored value in the product_code column) and a RID. The product table index would reside in a DB2 indexspace.

The customer table illustrated below shows four rows, although this table could also have thousands of rows for all of the customers of a company. The customer table has, for example, an index based on the column customer_number, which values are illustrated in ascending order. The values in the column customer_number are each unique since there is only one customer number assigned to each customer name and thus a customer number would not be included in this table more than once. Accordingly, an index for the customer table would include the key value (e.g., the value of the column customer_number) and a RID. The customer index would also reside in a DB2 indexspace.

| Customer Table | | |
|---|---|---|
| customer_number | buyer_name | customer_address |
| 1111111111 | John Doe | State A |
| 2222222222 | Fred Smith | State B |
| 3333333333 | Bill Smith | State C |
| 4444444444 | Steve Jones | State D |

As shown by the above tables, all of the rows in the Order_Entry table are valid (e.g., there are no referential integrity constraint violations) because the foreign key values in the column product_code of the Order_Entry table also exist in the product table and the values in the column customer_number of the Order_Entry table also exist in the customer table.

Conventional database management systems, such as DB2, provide the user with the ability to identify specific conditions that a row must meet before it can be added to a table. These conditions are referred to as "constraints" because they constrain the values that a row may include. Constraints include, for example, check constraints and referential integrity constraints. Check constraints include, for example, qualifying criteria for a particular value, such as a zip code value (e.g., the ship_to_zip value in the Order_Entry table) being in the range of 00000 to 99999. As discussed above, referential integrity constraints ensure that a value in a row of a table is valid when the value also exists in an index of another table.

Constraint enforcement can be performed prior to loading of data into a database table or after data has already been loaded into a database table. When constraint enforcement is performed after loading data into a database table, for example as part of a recovery operation following a hardware of software failure, the constraint enforcement is generally performed by a CHECK utility, such as CHECK DATA by IBM Corp., CHECK PLUS by BMC Software and FASTCHECK by Platinum technology, inc.

Conventional CHECK utilities ensure that data in the table do not violate any constraints that have been established for the table. Constraints can be established at the time the table is generated. For example, constraints can be defined when the table is originally created in the database system and are stored in the DB2 catalog, which can be subsequently queried by a CHECK utility to identify the constraint information.

To perform constraint enforcement, a conventional CHECK utility would, for example, be initialized and identify any applicable constraints for the table to be checked by reading the DB2 catalog, as is known in the art. The CHECK utility would, for example, then read each row of the database table and check for check constraint violations and/or referential integrity constraint violations.

As is known in the art, an exception table is generated prior to each time a CHECK utility operates upon a table (e.g., a new exception table is generated or a prior exception table replaced each time constraint enforcement is performed). For example, when a user creates a job stream to execute a CHECK utility, a step of the job stream includes creating a new exception table. The exception table is, for example, a mirror image of the database table except that the exception table only contains the rows including a constraint violation. For example, each time a CHECK utility identifies a constraint violation, the CHECK utility copies the entire row into the exception table. An exemplary SQL statement to copy rows in error into an exception table is as follows.

```
INSERT INTO PDLNR.EXTDOCDPP4
    VALUES ('SALE'
        ,'2004-10-04'
        ,'07.55.34
        ,0
        ,33329
        ,'v'
        ,-.05
        ,X' 0000201'
        ,CURRENT TIMESTAMP);
```

As shown by the above code, a row containing a constraint violation in database table PDLNR.TDOCDPP will be copied into exception table PDLNR.EXTDOCDPP4.

Prior to the CHECK utility utilizing an exception table, however, the exception table must be created. Further, if the CHECK utility has previously operated upon a table, the previously created exception table must be deleted and a new exception table created. An example of execution of a prior art CHECK utility is as follows regarding creation and deletion of exception tables. For example, assume a typical user application system having three parent tables and thirty one dependent tables (other combinations of parent and dependent tables are possible). When the customer executes a conventional CHECK utility for the dependent tables, an exception table is needed for each dependent table. As described above and known in the art, each exception table is, for example, a work table used to contain rows that the CHECK utility identifies as violating a constraint. When checking a dependent table tablespace for a referential integrity constraint violation, the user of a conventional CHECK utility needs to perform the following steps.

For example, for each dependent table, the user must code and execute the following exemplary SQL statements.

```
DROP TABLESPACE DBISIP.TSISIP01;
CREATE TABLESPACE TSISIP01
    IN DBISIP
        USING STOGROUP          SGISIP
                                PRIQTY 52
                                SECQTY 26
                                ERASE NO
        FREEPAGE 0
        PCTFREEE 5
    BUFFERPOOL BP0
    LOCKSIZE ANY
    CLOSE YES
    LOCKMAX SYSTEM
    CCSID EBCDIC
CREATE TABLE PDISIP.TBHORDCT
    LIKE PDUTL03.TBHORDCT
    IN DBISIP.TSISP01;
ALTER TABLE PDISIP.TSISIP01
    ADD RID CHAR(4);
ALTER TABLE PDISIP.TBHORDCT
    ADD TIME TIMESTAMP NOT NULL WITH
    DEFAULT
```

The above code describes, for example, the steps of dropping an existing exception table (e.g., TSISIP01) and creating a new exception table (e.g., TSISIP01) for each dependent table to be checked. In addition, the code illustrates exemplary alterations needed by the CHECK utility for the newly created exception tables (e.g., add a new column for row identification and a new column for a timestamp).

As the above example has thirty one dependent tablespaces, the above code must be written and executed thirty one times (e.g., once for each dependent tablespace). In addition, the user of the CHECK utility also has to code a control statement to run the CHECK utility, the control statement naming all of the dependent tablespaces to be checked as well as identifying all the exception tables associated with the dependent tables. Exemplary SQL statements that would be written by a user for this purpose are shown below.

```
CHECK DATA
  TABLESPACE JTINLAND.SCHORDCT
, TABLESPACE JTINLAND.SCHITMDI
, TABLESPACE JTINLAND.SCHHDINF
, TABLESPACE JTINLAND.SCHREFL2
, TABLESPACE JTINLAND.SCHCMAIL
, TABLESPACE JTINLAND.SCHBILDG
, TABLESPACE JTINLAND.SCHFACFW
, TABLESPACE JTINLAND.SCHEHRAC
, TABLESPACE JTINLAND.SCHCOATI
, TABLESPACE JTINLAND.SCHCTGCM
, TABLESPACE JTINLAND.SCHSSTCK
, TABLESPACE JTINLAND.SCHSRORD
, TABLESPACE JTINLAND.SCPEPRCE
, TABLESPACE JTINLAND.SQOMFGHD
, TABLESPACE JTINLAND.SQOMFCHI
, TABLESPACE JTINLAND.SQOMFCMT
, TABLESPACE JTINLAND.SQOMFOVR
, TABLESPACE JTINLAND.SQOMFOVU
, TABLESPACE JTINLAND.SQOMFMPL
, TABLESPACE JTINLAND.SQOMFOVP
, TABLESPACE JTINLAND.SQOMFCHE
, TABLESPACE JTINLAND.SQOMFUNT
, TABLESPACE JTINLAND.SQOMFTRQ
, TABLESPACE JTINLAND.SCHEITMR
, TABLESPACE JTINLAND.SCHORDFW
, TABLESPACE JTINLAND.SCHORHLD
, TABLESPACE JTINLAND.SCHREFRL
, TABLESPACE JTINLAND.SCHRETYP
, TABLESPACE JTINLAND.SCPEPICS
, TABLESPACE JTINLAND.SCHERCYL
, TABLESPACE JTINLAND.SCHCACKW
    FOR EXCEPTION IN PDUTL03.TBHORDCT USE PDISIP.TBHORDCT
    FOR EXCEPTION IN PDUTL03.TBHITMDI USE PDISIP.TBHITMDI
    FOR EXCEPTION IN PDUTL03.TBHHDINF USE PDISIP.TBHHDINF
    FOR EXCEPTION IN PDUTL03.TBHREFL2 USE PDISIP.TBHREFL2
    FOR EXCEPTION IN PDUTL03.TBHCMAIL USE PDISIP.TBHCMAIL
    FOR EXCEPTION IN PDUTL03.TBHBILDG USE PDISIP.TBHBILDG
    FOR EXCEPTION IN PDUTL03.TBHFACFW USE PDISIP.TBHFACFW
    FOR EXCEPTION IN PDUTL03.TBHEHRAC USE PDISIP.TBHEHRAC
    FOR EXCEPTION IN PDUTL03.TBHCOATI USE PDISIP.TBHCOATI
    FOR EXCEPTION IN PDUTL03.TBHCTGCM USE PDISIP.TBHCTGCM
    FOR EXCEPTION IN PDUTL03.TBHSSTCK USE PDISIP.TBHSSTCK
    FOR EXCEPTION IN PDUTL03.TBHSRORD USE PDISIP.TBHSRORD
    FOR EXCEPTION IN PDUTL03.TBPEPRCE USE PDISIP.TBPEPRCE
    FOR EXCEPTION IN PDUTL03.TQOMFGHD USE PDISIP.TQOMFGHD
    FOR EXCEPTION IN PDUTL03.TQOMFCHI USE PDISIP.TQOMFCHI
    FOR EXCEPTION IN PDUTL03.TQOMFCMT USE PDISIP.TQOMFCMT
    FOR EXCEPTION IN PDUTL03.TQOMFOVR USE PDISIP.TQOMFOVR
    FOR EXCEPTION IN PDUTL03.TQOMFOVU USE PDISIP.TQOMFOVU
    FOR EXCEPTION IN PDUTL03.TQOMFMPL USE PDISIP.TQOMFMPL
    FOR EXCEPTION IN PDUTL03.TQOMFOVP USE PDISIP.TQOMFOVP
    FOR EXCEPTION IN PDUTL03.TQOMFCHE USE PDISIP.TQOMFCHE
    FOR EXCEPTION IN PDUTL03.TQOMFUNT USE PDISIP.TQOMFUNT
    FOR EXCEPTION IN PDUTL03.TQOMFTRQ USE PDISIP.TQOMFTRQ
    FOR EXCEPTION IN PDUTL03.TBHEITMR USE PDISIP.TBHEITMR
    FOR EXCEPTION IN PDUTL03.TBHORDFW USE PDISIP.TBHORDFW
    FOR EXCEPTION IN PDUTL03.TBHORHLD USE PDISIP.TBHORHLD
    FOR EXCEPTION IN PDUTL03.TBHREFRL USE PDISIP.TBHREFRL
    FOR EXCEPTION IN PDUTL03.TBHRETYP USE PDISIP.TBHRETYP
    FOR EXCEPTION IN PDUTL03.TBPEPICS USE PDISIP.TBPEPICS
    FOR EXCEPTION IN PDUTL03.TBHERCYL USE PDISIP.TBHERCYL
    FOR EXCEPTION IN PDUTL03.TBHCACKW USE PDISIP.TBHCACKW
```

As shown by the above control statement, each dependent tablespace is identified (e.g., "TABLESPACE JTINLAND.SCHORDCT" identifies dependent table SCHORDCT owned by database JTINLAND). After the thirty one dependent tables are identified, the exception table to be used for each dependent table is identified (e.g., "FOR EXCEPTION IN PDUTL03.TBHORDCT USE PDISIP.TBHORDCT" identifies exception table TBHORDCT to be used for dependent table TBHORDCT).

As indicated by the above exemplary code that must be written and executed for operation of conventional CHECK utilities to perform constraint enforcement, substantial effort must be expended by a user to, for example, drop existing exception table tablespaces created from prior operation of the CHECK utility and to create new exception table tablespaces.

As databases frequently have large numbers of dependent tables, the user must periodically perform referential integrity checks on these tables and all dependent tables. This process can be long and convoluted involving many steps and substantial amounts of hand coded SQL commands to identify the tables to check, create exception tables and specify the exception tables to the referential integrity CHECK utility. This process is not only time consuming, but also is prone to error. Therefore, it is desirable to simplify the tasks associated with dependent table referential integrity checking in an automated fashion.

SUMMARY OF THE INVENTION

According to an embodiment of the present invention, a process identifies the tablespaces to be checked by a CHECK utility so that the tablespaces and associated exception table tablespaces are automatically identified to the CHECK utility, thereby eliminating the need for substantial handcoding of SQL statement required by conventional CHECK utility operation. According to an exemplary embodiment of the present invention, a control statement including predetermined key words is provided to a CHECK utility, the CHECK utility parsing the control statement to drop existing exception table tablespaces and create new exception table tablespaces.

DETAILED DESCRIPTION OF THE INVENTION

Figure 1:
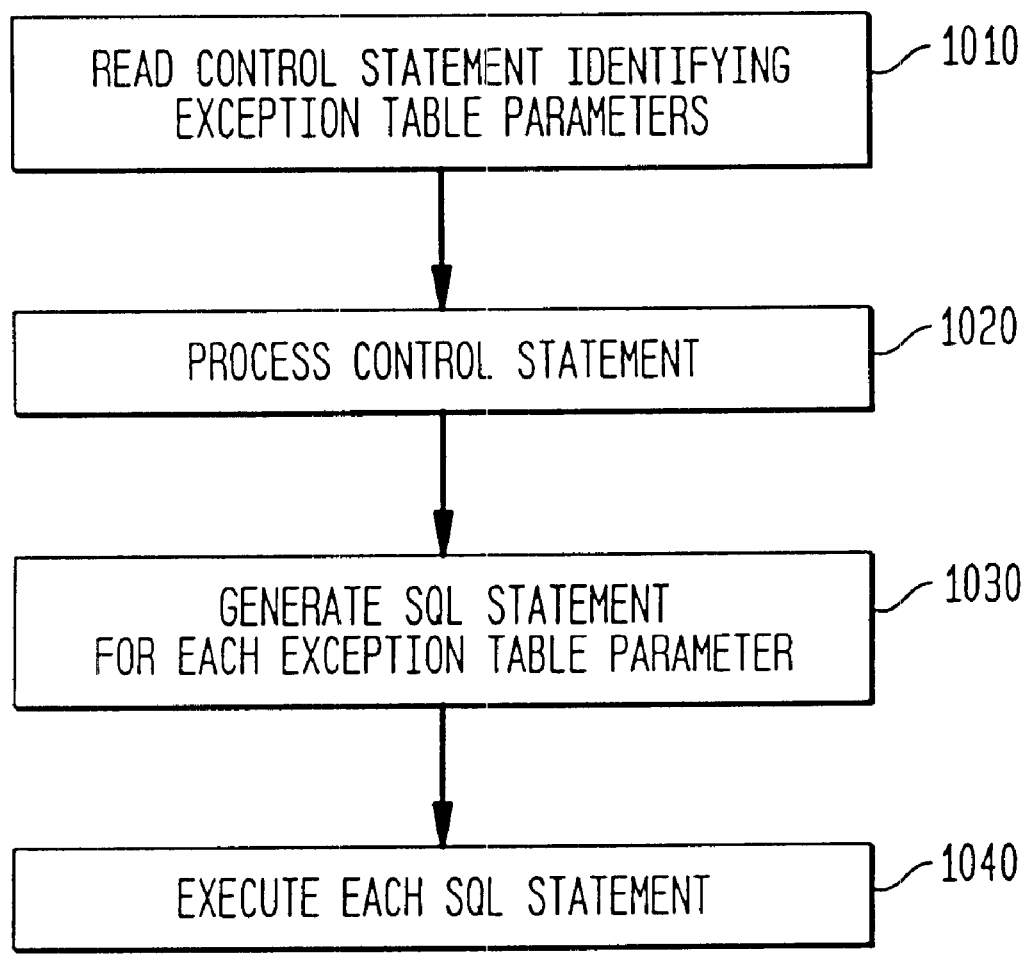
FIG. 1 illustrates an exemplary flowchart for maintaining exception tables for a CHECK utility according to an embodiment of the present invention.

FIG. 1 illustrates an exemplary flowchart for maintaining exception tables for a CHECK utility according to an embodiment of the present invention. As illustrated in FIG. 1, in step 1010, a control statement is read identifying the parameters needed to perform constraint enforcement on the desired tablespaces. In step 1020, the control statement is processed by, for example, a conventional CHECK utility modified in accordance with an embodiment of the present invention. In step 1030, the SQL statements needed to drop or create exception tables are generated. In step 1040, the SQL statements generated in step 1030 are executed.

Set forth below is an exemplary SQL control statement according to an embodiment of the present invention. For example, this control statement could be generated by a user of a CHECK utility in step 1010 illustrated in FIG. 1. The control statement would then be provided to a conventional CHECK utility for processing in accordance with an embodiment of the present invention.

```
CHECK DATA
  TABLESPACE JTINLAND.SCHORDCT
, TABLESPACE JTINLAND.SCHITMDI
, TABLESPACE JTINLAND.SCHHDINF
, TABLESPACE JTINLAND.SCHREF2
```

-continued

```
, TABLESPACE JTINLAND.SCHCMAIL
, TABLESPACE JTINLAND.SCHBILDG
, TABLESPACE JTINLAND.SCHFACFW
, TABLESPACE JTINLAND.SCHEHRAC
, TABLESPACE JTINLAND.SCHCOATI
, TABLESPACE JTINLAND.SCHCTGCM
, TABLESPACE JTINLAND.SCHSSTCK
, TABLESPACE JTINLAND.SCHSRORD
, TABLESPACE JTINLAND.SCPEPRCE
, TABLESPACE JTINLAND.SQOMFGHD
, TABLESPACE JTINLAND.SQOMFCHI
, TABLESPACE JTINLAND.SQOMFCMT
, TABLESPACE JTINLAND.SQOMFOVR
, TABLESPACE JTINLAND.SQOMFOVU
, TABLESPACE JTINLAND.SQOMFMPL
, TABLESPACE JTINLAND.SQOMFOVP
, TABLESPACE JTINLAND.SQOMFCHE
, TABLESPACE JTINLAND.SQOMFUNT
, TABLESPACE JTINLAND.SQOMFTRQ
, TABLESPACE JTINLAND.SCHEITMR
, TABLESPACE JTINLAND.SCHORDFW
, TABLESPACE JTINLAND.SCHORHLD
, TABLESPACE JTINLAND.SCHREFRL
, TABLESPACE JTINLAND.SCHRETYP
, TABLESPACE JTINLAND.SCPEPICS
, TABLESPACE JTINLAND.SCHERCYL
, TABLESPACE JTINLAND.SCHCACKW
     USING
       DATABASE DBISIP
       TABLESPACE TSISIP
       STOGROUP SGISIP
       PRIQTY 52
       SECQTY 26
       OWNER PDISIP
       DROP YES
```

As indicated in the above exemplary SQL control statement, the control statement contains, following the term USING, several key words that are processed by a conventional CHECK utility in accordance with an embodiment of the present invention. The format of the control statement is a matter of design choice, provided that the format can be processed (e.g., parsed) by the check utility. Prior to the key words, however, the names of the dependent tablespaces to be checked are provided by the user, from which the dependent tables to be checked can be determined. For example, the CHECK utility can identify the name of dependent table in each dependent tablespace by, for example, reading the DB2 catalog of the database, as is known in the art. A description of how to read the DB2 catalog is contained in co-pending application Ser. No. 09/151,750 entitled DYNAMIC DETERMINATION OF OPTIMAL PROCESS FOR ENFORCING CONSTRAINTS, assigned to the assignee of the present application and which is hereby expressly incorporated by reference.

In another embodiment of the present invention, instead of providing the names of all the dependent tablespaces to be checked, the names of the parent tablespaces can be provided in the control statements. With this information, the DB2 catalog could be read to identify the associated dependent tablespaces, thus eliminating the need for the user to even manually identify the dependent tablespaces. For example, the control statement identifying only the parent tablespace can have any format or syntax provided that the format or syntax can be interpreted and processed by the appropriate entity, such as a CHECK utility or other DB2 utility that can access a DB2 catalog.

An exemplary SQL control statement according to an embodiment of the present invention includes key words for predetermined exception table parameters. For example, one key word is the name of the database in which the tablespaces will be created (e.g., the database name for the logical grouping of newly-created tablespaces). In this example, the name of the database is DBISIP. Another keyword is the exception tablespace name to be created, for example TSISIP (which is in database DBISIP). If multiple exception tablespaces are needed, the method according to an embodiment of the present invention can create them, for example consecutively numbering tablespaces using the same tablespace name (e.g., TSISIP01, TSISIP02, etc.). The key words also include a storage group identifier as is known in the art (e.g., where the exception tablespace will reside). In this example the STOGROUP is named SGISIP.

The key words according to an embodiment of the present invention also include, for example, a primary quantity of DASD and secondary quantity of DASD to be used within the storage group (e.g., the pages of DASD to be allocated by DB2 for the exception tablespace). The primary and secondary quantities of DASD can, for example, be specified by the user, as is known in the art, for example based on an estimate of the number of errors that will be identified by the CHECK utility). In this example, 52 pages of DASD are allocated for the storage group with another 26 pages available if necessary.

As illustrated in the control statement, the key words may also identify an owner of the exception tables to be created, in this case PDISIP. This owner will be used, for example, in the CREATE TABLE SQL statement generated by the CHECK utility in response to the control statement according to an embodiment of the present invention. In addition, the key words include a drop statement to indicate whether existing exception tables are to be dropped before a new exception table is created or if existing exception tables are to be re-used. According to an exemplary embodiment of the present invention, newly created exception tables are assigned an owner provided by a user and have the same name as the corresponding dependent table being checked (e.g., which has a different owner name).

An exemplary process for a conventional CHECK utility to generate and drop exception tables in accordance with an exemplary embodiment of the present invention is set forth as psuedo code below and illustrated in FIG. 2.

```
PARSE CONTROL STATEMENT
IF KEYWORD = USING
    IF DROP = YES
        DROP THE TABLESPACE
    ENDIF
    CREATE TABLESPACE
    CREATE TABLE
    ALTER TABLE TWICE
    SET FLAG EXCEPTION_TABLE
    SET FLAG DROP_IF_EMPTY
ELSE
IF KEYWORD = FOR EXCEPTION IN
    SET FLAG EXCEPTION_TABLE
ENDIF
PERFORM CHECK DATA PROCESS
IF NO_VIOLATIONS
    IF DROP_IF_EMPTY
        DROP TABLESPACES
    ENDIF
ENDIF
```

Figure 2:
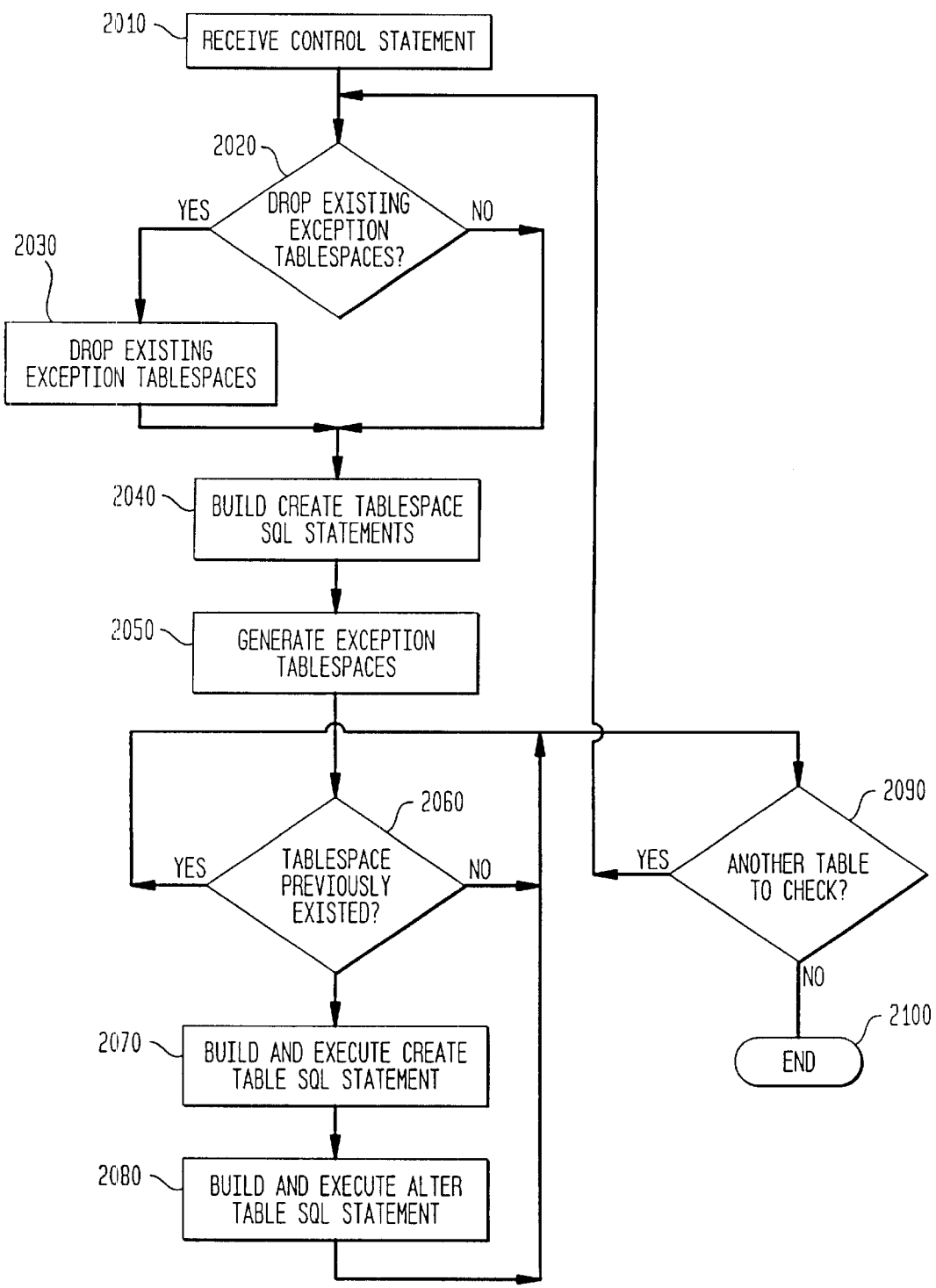
FIG. 2 is illustrates another exemplary flowchart for maintaining exception tables for a CHECK utility according to an embodiment of the present invention.

FIG. 2 illustrates another exemplary flowchart for maintaining exception tables for a CHECK utility according to an embodiment of the present invention. In step 2010, a control statement is received by a conventional CHECK utility. For example, according to an exemplary embodiment of the present invention, the control statement would include predetermined exception table parameters, as described above, for parsing by the CHECK utility. In step 2020, the received control statement is parsed and it is determined if a the DROP parameter is set to, for example, yes or no. If the value is no, the existing exception tablespace from a prior checking operation will be used for the current checking operation. If the drop value is yes, then in step 2030 the existing exception tablespace will be dropped.

Following step 2030, a CREATE TABLESPACE SQL statement is built in step 2040 by the CHECK utility using, for example, the tablespace name obtained from the parsed control statement (e.g., a data structure is built). In step 2050, the exception tablespace is generated, for example by executing the CREATE TABLESPACE SQL statement, (e.g., a portion of DASD is allocated for the exception tablespaces). In step 2060, it is determined if the exception tablespace previously existed. For example, DB2 indicates (e.g., via a SQL code) if a new exception tablespace was created (e.g., if the execution of the SQL statement was successful) or if it could not be created, for example, because the tablespace already existed. If the exception tablespace previously existed, the process continues at step 2090, described below. If the exception tablespace did not previously exist, then the process continues at step 2070. In step 2070, a CREATE TABLE SQL statement is built and executed to create the exception table. In step 2080, any required ALTER SQL statements are built and executed, for example to add row identification or a time stamp to the exception table.

In step 2090, it is determined if there is another dependent table to check. If there are no more tables to check, the process ends at step 2100. If there is another table to check, the process returns to step 2020 until all identified tables have been checked. In contrast to coventional CHECK utility handling of exception tables, which require that all exception tables be identified by the user of the CHECK utility, according to the present invention the dependent tables are automatically identified and the corresponding exception tables generated, thus avoiding potential errors or omissions in identifying all required exception tables.

Accordingly, the above-identified process can be performed by a conventional CHECK utility (e.g., the method can be provided as a software algorithm in the CHECK utility software) to create and delete exception tables according to an embodiment of the present invention. For example, using the method of the present invention, the inclusion of the three parent tables in the control statement along with the specified key words would result in the automatic generation and execution of SQL statements needed to generate the thirty one exception table tablespaces required for constraint enforcement. Thus, according to an embodiment of the present invention, less work is performed by a user of a CHECK utility to generate the exception tables required for referential integrity constraint enforcement than would be required with conventional approached to constraint checking.

What is claimed is:

1. A method for maintaining exception tables, comprising the steps of:

generating a control statement including predetermined exception table parameters, the control statement identifying one or more parameters needed to perform constraint enforcement on selected tablespaces, and the exception table parameters including at least whether to drop or reuse a previously existing exception table;

receiving the control statement in a CHECK utility;

generating a SQL statement for each of the predetermined exception table parameters; and executing each SQL statement, wherein one of generation and deletion of an exception table is performed as a function of executing at least one SQL statement, the exception table having an image of one or more database rows that contain a constraint violation.

2. A method for maintaining exception tables in a database system, comprising the steps of:

receiving a control statement, the control statement including at least one predetermined exception table parameter, the control statement identifying one or more parameters needed to perform constraint enforcement on selected tablespaces, and the at least one predetermined exception table parameter including whether to drop or reuse a previously existing exception table, an exception table having an image of one or more database rows that contain a constraint violation;

parsing the control statement;

generating a SQL statement as a function of the parsed control statement for the at least one exception table parameter; and executing the SQL statement.

3. The method according to claim 2, wherein the at least one predetermined exception table parameter includes one of a database name, an exception tablespace name, a storage group name, a primary quantity value, a secondary quantity value, an owner name and a drop value.

4. The method according to claim 3, wherein the control statement includes a plurality of exception table parameters.

5. The method according to claim 2, wherein the step of parsing the control statement is performed by a conventional CHECK utility.

6. The method according to claim 2, wherein the step of generating the SQL statement includes generating a SQL statement for a plurality of exception table parameters.

7. A method of maintaining exception tables, comprising:

generating a control statement including one or more predetermined exception table keywords and one or more selected tablespaces, the control statement identifying one or more parameters needed to perform constraint enforcement on selected tablespaces, and the one or more predetermined exception table keywords including whether to drop or reuse a previously existing exception table, an exception table having an image of one or more database rows that contain a constraint violation;

generating a SQL statement for each of the predetermined exception table keywords;

executing a SQL statement to operate on the one or more selected tablespaces and to operate on dependent tables of the one or more selected tablespaces, wherein one of generation and deletion of an exception table is performed as a function of executing at least one SQL statement.

8. A method for maintaining exception tables, comprising:

generating a control statement including one or more predetermined exception table parameters for processing by a check utility, the control statement providing instructions to the check utility for creating one or more exception tables having an image of one or more database rows that contain a constraint violation, the control statement identifying one or more parameters needed to perform constraint enforcement on selected tablespaces, and the exception table parameters including at least whether to drop or reuse a previously existing exception table;

generating a SQL statement for each of the predetermined exception table parameters; and executing each SQL statement.

9. A method of maintaining exception tables as claimed in claim 8, wherein the generating a SQL statement includes:

generating automatically from the control statement a SQL statement for each of the predetermined exception table parameters, the SQL statement further including one of generation and deletion of an exception table.

* * * * *